United States Patent
Akman et al.

(10) Patent No.: US 8,229,416 B2
(45) Date of Patent: Jul. 24, 2012

(54) METHODS, SYSTEMS, AND COMPUTER READABLE MEDIA FOR STRESS TESTING MOBILE NETWORK EQUIPMENT USING A COMMON PUBLIC RADIO INTERFACE (CPRI)

(75) Inventors: Arda Akman, Apex, NC (US); Matthew Balkwill, Wiltshire (GB); David Hammond, Morrisville, NC (US); Richard Karp, Palo Alto, CA (US); Edward Panofsky, Woodside, CA (US); Glenn Stewart, Mountain View, CA (US); Kalyan Sundhar, Cary, NC (US)

(73) Assignee: Ixia, Calabasas, CA (US)

( * ) Notice: Subject to any disclaimer, the term of this patent is extended or adjusted under 35 U.S.C. 154(b) by 460 days.

(21) Appl. No.: 12/337,285

(22) Filed: Dec. 17, 2008

(65) Prior Publication Data

US 2010/0075678 A1 Mar. 25, 2010

Related U.S. Application Data

(60) Provisional application No. 61/099,540, filed on Sep. 23, 2008.

(51) Int. Cl.
*H04W 24/00* (2009.01)
(52) U.S. Cl. .............. 455/423; 455/67.11; 455/419
(58) Field of Classification Search .............. 455/423, 455/424
See application file for complete search history.

(56) References Cited

U.S. PATENT DOCUMENTS

| | | | | |
|---|---|---|---|---|
| 7,286,802 B2* | 10/2007 | Beyme et al. | | 455/67.14 |
| 7,570,922 B2* | 8/2009 | Williams | | 455/67.11 |
| 7,813,262 B1* | 10/2010 | Rao | | 370/208 |
| 7,856,029 B2* | 12/2010 | Osterling et al. | | 370/437 |

FOREIGN PATENT DOCUMENTS

EP 1 474 742 B1 5/2007
WO WO 03/069814 A2 8/2003

OTHER PUBLICATIONS

"Coding of Speech at 8 kbit/s Using Conjuate-Structure Algebraic-Code-Excited Linear Prediction (CS-ACELP)," ITU-T, G.729, pp. 1-146 (Jan. 2007).

Sjoberg et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group, RFC 3267 (Jun. 2002).

"40, 32, 24, 16 kbit/s Adaptive Differential Pulse Code Modulation (ADPCM)," CCITT, G.726, pp. 1-59 (1990).

"Pulse Code Modulation (PCM) of Voice Frequencies," ITU-T G.711, pp. 1-10 (Copyright 1988).

* cited by examiner

*Primary Examiner* — Kamran Afshar
*Assistant Examiner* — Yousef Rod
(74) *Attorney, Agent, or Firm* — Jenkins, Wilson, Taylor & Hunt, P.A.

(57) ABSTRACT

Methods, systems, and computer readable media for stress testing mobile network equipment using CPRI are disclosed. According to one method, a plurality of messages is generated for simulating a plurality of user equipment (UE) devices. The plurality of messages is transmitted over a common public radio interface (CPRI) link to a radio equipment controller (REC) in order to stress test the REC component.

24 Claims, 7 Drawing Sheets

METHODS, SYSTEMS, AND COMPUTER READABLE MEDIA FOR STRESS TESTING MOBILE NETWORK EQUIPMENT USING A COMMON PUBLIC RADIO INTERFACE (CPRI)

RELATED APPLICATIONS

This application claims the benefit of U.S. Provisional Patent Application Ser. No. 61/099,540 filed Sep. 23, 2008; the disclosure of which is incorporated herein by reference in its entirety.

TECHNICAL FIELD

The subject matter described herein relates to mobile network equipment testing. More specifically, the subject matter relates to methods, systems, and computer readable media for stress testing mobile network equipment using CPRI.

BACKGROUND

As the number of users connected to mobile networks increases, so too does the need to ensure reliable and efficient operation of mobile network equipment. Therefore, mobile network operators typically test mobile network equipment using dedicated test equipment that simulates various network conditions before the equipment is deployed in a live network. Simulated network conditions may include, for example, simulating a maximum number of user equipment devices or UEs capable of simultaneously registering/de-registering with the network, simulating inter-/intra-mobile network equipment handover, transmitting bearer traffic, and/or combinations thereof. Generally, mobile network equipment testing may be divided into three categories: functional correctness testing (e.g., protocol validation and compliance), inter-system compatibility and integration testing, and stress testing.

For many mobile communications networks, such as long term evolution (LTE) networks and other emerging mobile network technologies, mobile network equipment testing has primarily focused on testing for functional correctness and inter-system compatibility of mobile network equipment. For example, the evolved Node B or eNodeB is a mobile network entity in LTE networks that has functionality similar to that of a base station in 2G networks or a Node B in 3G mobile networks. The eNB communicates directly with LTE UEs and is responsible for header compression, ciphering, reliable delivery of packets, admission control, and radio resource management. According to common public radio interface (CPRI) specifications, mobile network equipment such as BSs, Node Bs, and eNBs may be logically decomposed into a radio equipment controller (REC) and one or more radio equipment (RE) components being connected together via a CPRI link. Because testing for functional correctness and inter-system compatibility of mobile network equipment does not typically require simulating more than one UE at a time, conventional mobile network equipment testing has focused on simulating a single UE and its air interface in great detail. As a result, methods for simulating large numbers of UEs needed for stress testing a mobile network device (e.g., hundreds or thousands of UEs) have been limited. In order to address this shortcoming, conventional methods for stress testing mobile network equipment have attempted to leverage existing models of individual UEs and the associated air interface by multiplying the number of individual UE simulators or by using banks of real UE devices.

However, one problem associated with conventional models for testing mobile network equipment is that modeling individual UEs and their associated communications over a simulated air interface is not scalable to the number of UEs needed for stress testing a typical mobile network device. For example, using conventional methods, the same fixed cost is associated with simulating each individual UE. As a result, the cost of fully and accurately stress testing a single mobile network device scales linearly with the number of simulated UEs, and therefore becomes prohibitively expensive for large numbers of simulated UEs. As a result, conventional methods are typically limited to simulating only a fraction of per-sector or total mobile network equipment capacity before cost or technical limitations prevent further scaling and thus are not effective for stress testing.

Accordingly, in light of these difficulties, a long felt need exists for improved methods, systems, and computer readable media for performing accurate and highly scalable stress testing of mobile network equipment nodes, such as eNBs.

SUMMARY

Methods, systems, and computer readable media for stress testing mobile network equipment using CPRI are disclosed. According to one method, a plurality of messages is generated for simulating a plurality of user equipment (UE) devices. The plurality of messages is transmitted over a common public radio interface (CPRI) link to a radio equipment controller (REC) in order to stress test the REC component.

A system for testing mobile network equipment using CPRI is also disclosed. The system includes a radio equipment controller (REC) component of a mobile network device for receiving messages over a common public radio interface (CPRI) link. A multi-UE simulator generates and transmits a plurality of messages for simulating a plurality of user equipment (UE) devices to the REC over the CPRI link to stress test the REC component.

The subject matter described herein for stress testing mobile network equipment over a CPRI link may be implemented using a computer program product comprising computer executable instructions embodied in a tangible computer readable medium that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for routing a call described herein. In addition, a computer readable medium that implements the subject matter described herein may be distributed across multiple physical devices and/or computing platforms.

Definitions

As used herein, the term "mobile communications network" refers to a system of nodes that support wireless communications between user terminals. Exemplary types of mobile communications network may include 2G networks (e.g., GSM), 3G networks (e.g., UMTS), and 4G+ networks (e.g., LTE).

As used herein, the terms "mobile network equipment" and mobile network device" refer to a mobile entity that provides radio coverage for mobile handsets within a geographic area by providing translation between various radio interfaces to mobile handsets and wired interfaces to other mobile communications network nodes. Thus, mobile users do not communicate directly with each other, but instead communicate directly with mobile network devices over an air interface.

As used herein, the term "user equipment" (UE) refers to a mobile communications terminal operated by a user in a mobile communications network. For example, in LTE networks, the UE communicates directly with the eNB using an air (i.e., Uu) interface. Exemplary types of UEs include mobile phones and computers with wireless communications capabilities. Examples of UEs are provided in 3GPP technical specification (TS) 36.306, Release 8, the disclosure of which is incorporated herein by reference in its entirety.

As used herein, the term "cell" refers to a geographical service area served by a mobile network device (e.g., BS/NodeB/eNB) in a mobile communications network. A cell may be divided into one or more sectors.

As used herein, the term "sector" refers to a wedge-shaped geographical service area expanding from the mobile network device (e.g., BS/NodeB/eNB) antenna, where sectors are defined by the service areas of directional antennas (e.g., MIMO, beam forming). A mobile network device supporting multiple sectors may support a full channel bandwidth for each sector. Typical configurations include 1, 3, and 6 sectors per cell.

As used herein, the term multiple input multiple output (MIMO) refers to the use of multiple antennas for transmission and reception of a single data stream in order to improve data throughput. Using spatially separated multiple antennas at the mobile network equipment and at the UE, each transmitting/receiving antenna pair provides a path between the UE and the mobile network equipment. Careful analysis can separate this path from the path formed by other pairs, even though different pairs may use the same frequency, by exploiting imperfections in the channel such as multi-path, delay and phase differences, etc. Typical MIMO configurations include 2×2 and 4×4 MIMO corresponding to 2 transmitting/2 receiving antennas and 4 transmitting/4 receiving antennas, respectively.

As used herein, the terms "base transceiver station" (BTS) and "base station" (BS) refer to an entity in a 2G network for communicating with one or more UEs located within its coverage area (e.g., sector, cell) via an air interface. A BS may be associated with one or more antennas for subdividing a cell into one or more sectors, depending on configuration. In cells containing multiple sectors, each sector may be served by an antenna that concentrates the flow of power to that sector. Typical configurations include 3-sector cells, wherein each sector is served by a separate directional antenna. In cells that are not divided into sectors, each cell may be served by a unidirectional antenna that radiates a signal in all directions equally.

As used herein, the term "base station controller" (BSC) refers to a device in a 2G network which controls one or more BTSs. Exemplary functions performed by a BSC may include, but are not limited to, radio channel allocation and controlling inter-BTS handovers. Thus, a BSC may serve to concentrate several low capacity/low utilization connections from a plurality of BTSs into fewer connections of higher utilization to other network devices such as mobile switching centers (MSCs).

As used herein, the term "NodeB" refers to a device in a 3G network that performs functions similar to a BTS. A NodeB contains radio frequency transmitter(s) and the receiver(s) for communicating directly with UEs. The area covered by a NodeB (i.e., a cell) may be divided into one or more sectors, depending on the configuration and type of antenna. Common configurations include a single omni-directional antenna-based cell (360°), a 3 sector cell (3×120°), and a 6 sector cell (3 sectors 120° wide overlapping with 3 sectors of different frequency).

As used herein, the term "radio network controller" (RNC) refers to a device in a 3G network controlling one or more NodeBs. Exemplary functions performed by an RNC may include, but are not limited to, radio resource management, mobility management, and encryption.

As used herein, the term "long term evolution" (LTE) refers to a mobile communications network architecture developed by the third generation partnership project (3GPP) to improve UMTS mobile phone standards. An LTE network may be comprised of an evolved packet system (EPS), an evolved UTRAN (E-UTRAN), and an evolved packet core (EPC). LTE/SAE architecture is streamlined to optimize network performance, maximize data throughput, and minimize latency. Rather than four nodes (Node B, RNC, SGSN, GGSN), LTE networks comprise a simpler configuration including just the eNodeB and the Access Gateway (aGW), where the aGW consists of one logical user plane entity (i.e., SAE GW) and one control plane entity (i.e., MME).

As used herein, the term "common public radio interface" (CPRI) refers to a standard for describing a wired communications interface between the REC and the RE components of a networking component, such as a wireless base station. CPRI may be used to divide networking components that utilize a variety of access technologies including LTE, GSM, GPRS, EDGE, UMTS (including releases R99, R5, R7, HSPA, and HSPA+ evolutionary steps), CDMA, CDMA2000, and WiMAX. CPRI is an industry cooperation aimed at defining the internal interface between two basic building blocks, the so-called radio equipment control (REC) and the radio equipment (RE) itself. CPRI enables flexible and efficient product differentiation for radio base stations and independent technology evolution by dividing networking components (i.e., wireless base stations) into two parts (i.e., the RE and the REC) with a digital connection between the two elements. Data transmitted over a CPRI link consists of digitized samples of the analog baseband signal, plus a low bandwidth control channel. Data carried over the CPRI link is a continuous stream of numbers, representing the digitized samples of the baseband waveform. A CPRI connection can support several "antennas", each "antenna" representing a sector or a MIMO antenna. CPRI does not limit the data rate of connections, but may limit the number of antennas that may be carried on a single CPRI connection.

As used herein, the terms "evolved Node B," "enhanced Node B,""eNodeB," and "eNB" refer to an LTE mobile network entity having functionality similar to that of a radio network controller (RNC) and a base station (BS) in 2G networks or an RNC and a Node B in 3G mobile networks. The eNB communicates directly with LTE UEs and is responsible for header compression, ciphering, reliable delivery of packets, admission control, and radio resource management. By eliminating the RNC from the data path and incorporating its functions into the eNB, packet delay may be decreased and network performance may be increased. As described above, CPRI provides for dividing the eNB into two parts, a radio equipment controller (REC) component and one or more radio equipment (RE) components, where multiple REs may be associated with a single REC being connected together using a wired CPRI link. As used herein, the terms RE and REC will primarily refer to components of an eNB, however it is appreciated that they may also refer to components of other (i.e., non-LTE) networking components. One or more REs and a corresponding REC may either be physically separated or co-located. For example, an RE may be located close to an antenna, while the REC may be located in a more convenient and/or accessible site.

As used herein, the term "radio equipment" (RE) refers to a device that serves as the air interface to user equipment and implements analog radio frequency functions. RE may include one or more antennas for communicating with one or more UEs, and may include support for a variety of antenna types and configurations including, but not limited to, single omni-directional antennas and MIMO arrays of directional antennas. Exemplary functions that may be performed by an RE include digital-to-analog (D/A) conversion, analog-to-digital (A/D) conversion, carrier multiplexing, power amplification, and RF filtering.

As used herein, the term "radio equipment controller" (REC) refers to a device in wireless communications network for implementing radio functions of the digital baseband domain. These functions may include, but are not limited to, radio base station control and management, and channel coding and de-coding.

As used herein, the term "Uu" or "air" interface refers to an interface between the UE and mobile network equipment (e.g., the eNB/NodeB/BS) wherein air is the physical transmission medium. For mobile network devices utilizing CPRI, the air interface may more precisely refer to the interface between a UE and an RE.

As used herein, the term "mobile management entity" (MME) refers to a mobile network node that manages non access stratum (NAS)/control plane signaling functions such as network attach, UE authentication, bearer channel setup, and mobility management. For example, an MME may generate temporary identities, allocate the identities to UEs, and authenticate the UE.

As used herein, the term "system architecture evolution" (SAE) gateway (GW) refers to a core network data plane node that manages the data plane, routes and forwards data packets, and stores and manages user context. Packet routing functions performed by the SAE gateway may include packet screening, IP header compression, ciphering, integrity protection, policy enforcement, and lawful intercept.

BRIEF DESCRIPTION OF THE DRAWINGS

The subject matter described herein will now be explained with reference to the accompanying drawings of which.

DETAILED DESCRIPTION

In order to overcome the difficulties described above, the subject matter described herein includes methods, systems, and computer readable media for performing accurate and highly scalable stress testing of mobile network equipment by connecting a multi-UE simulator directly to the REC component via a wired CPRI link rather than via the RE via the air interface. As a result, it is possible to simulate a much larger number of UEs than conventional systems. One advantage to simulating a large number of UEs includes the ability to stress-test mobile network equipment, such as eNBs, up to, including, and beyond their maximum capacities, for example, to ensure that they do not completely fail in overload conditions. Consequently, a network operator can more accurately model/predict the behavior of their mobile network thereby allowing network operators to better plan and optimize the deployment of network equipment.

According to another aspect, the subject matter described herein includes providing a set of pre-defined, user-customizable scripts corresponding to common usage scenarios, as well as a scripting environment for creating additional scripts for simulating network conditions of interest to a specific network. As a result, network operators may not need to dedicate as many resources to writing custom scripts or training as is typically required in conventional test systems in order to obtain accurate test results/information for a device under test.

According to another aspect, the multi-UE simulator may be connected to a network node simulator to form a mobile network equipment simulation and testing platform for obtaining a more complete picture of mobile network equipment under test. The network node simulator may simulate other network nodes connected to mobile network equipment under test (i.e., non-UEs), such as adjacent eNBs, MMEs, and SAE gateways. Thus, in addition to the advantages described above, network node simulation allows for testing equipment costs to be less than conventional systems because many different network architectures/usage scenarios to be simulated from the same front-end without requiring investment in multiple different pieces of equipment simply by using multiple test profiles. The time-to-market may also be reduced over conventional systems because the network simulation and testing platform may be automatically updated to support the latest specifications of mobile network communications protocols. Finally, the quality and thoroughness of the testing may be increased because fewer resources are dedicated to designing the test tool and instead may be used to improve the test plan.

Figure 1:
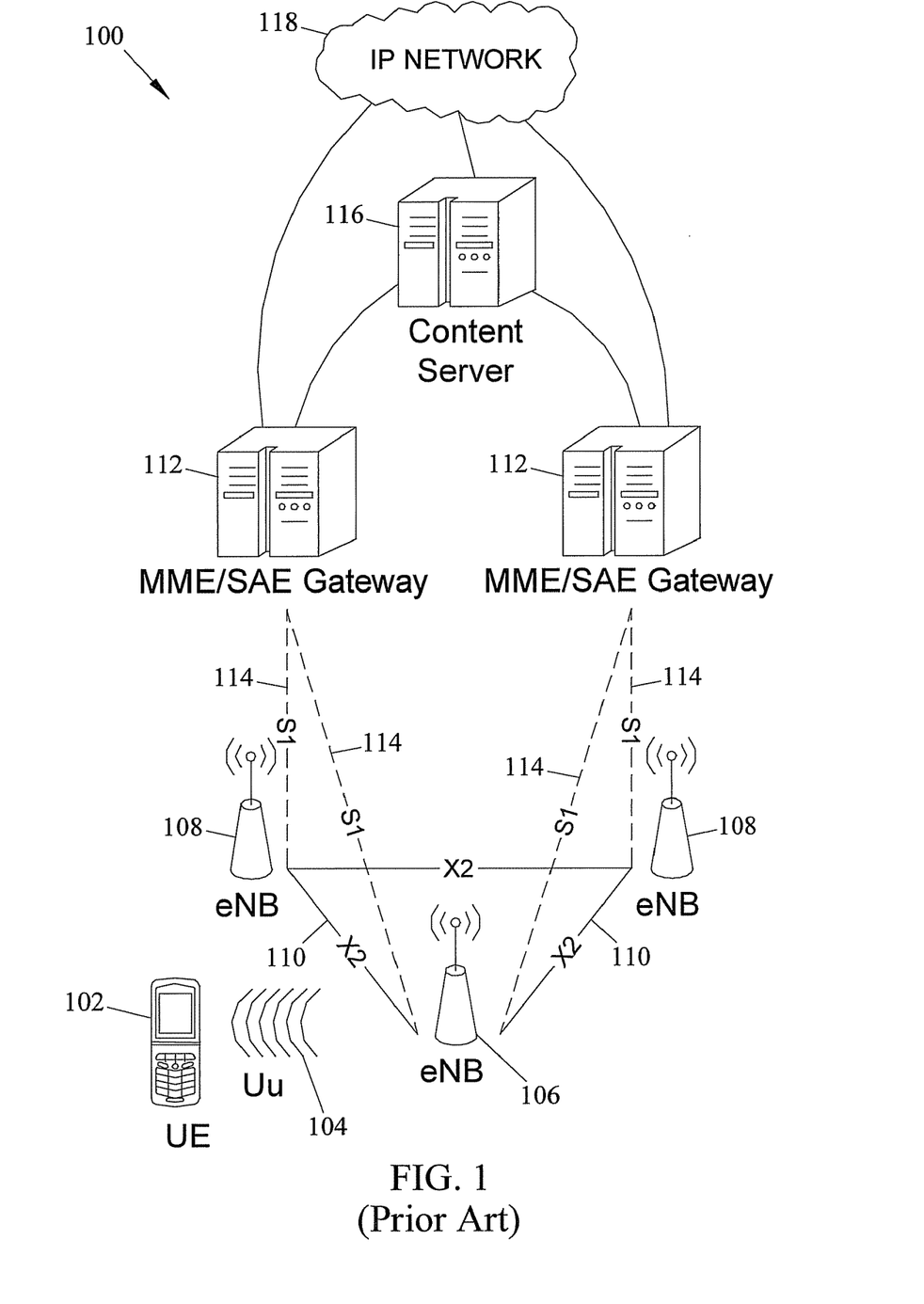
FIG. 1 is a network diagram of an exemplary conventional long term evolution (LTE) network.

The methods and systems of the subject matter described herein can be implemented in hardware, firmware, software, or any combination thereof. In one exemplary embodiment, the methods and systems for testing mobile network equipment node over CPRI may be implemented as application software adapted to be executed by a processor. FIG. 1 is a network diagram of an exemplary network for illustrating the location and relationships between various components connected to a mobile network equipment to be tested according to methods and systems described herein. As stated above, the methods and systems described herein may be applied to a variety of mobile network communications technologies including, but not limited to LTE networks, which utilize CPRI as the communications interface between RE and REC components. However, for consistency and simplicity of illustration, the examples and embodiments used herein will be based upon a long term evolution (LTE) network and LTE mobile network equipment (i.e., eNB). Referring to FIG. 1, LTE network 100 may include user equipment (UE) 102 connected via air interface 104 to eNodeB 106. UE 102 may include an LTE-capable handset, mobile phone, laptop computer, or other similar device.

eNB 106 may be connected to adjacent eNBs 108 via X2 interface links 110 for serving other UEs in nearby coverage areas. Each eNB 106 and 108 may also be connected to MME/SAE gateway 112 via S1-U/S1-C interface links 114. MME 112 may be a mobile network node that manages non access stratum (NAS)/control plane signaling functions such as network attach, UE authentication, bearer channel setup, and mobility management. SAE gateway 112 may include a core network data plane node that manages the data plane, routes and forwards data packets, and stores and manages user context. Additionally, MME/SAE gateway 112 may be connected to one or more content servers, such as content server 116, for serving voice, data, and video content (e.g. using multimedia broadcast multicast service (MBMS)). Throughout the subject matter described herein, eNB 106 may be the device under test, as located in the exemplary network configuration shown in FIG. 1. However, it is appreciated that other eNBs and network configurations may be used without departing from the scope of the subject matter described herein for testing LTE nodes using multi-UE simulation over a CPRI link.

Figure 2:
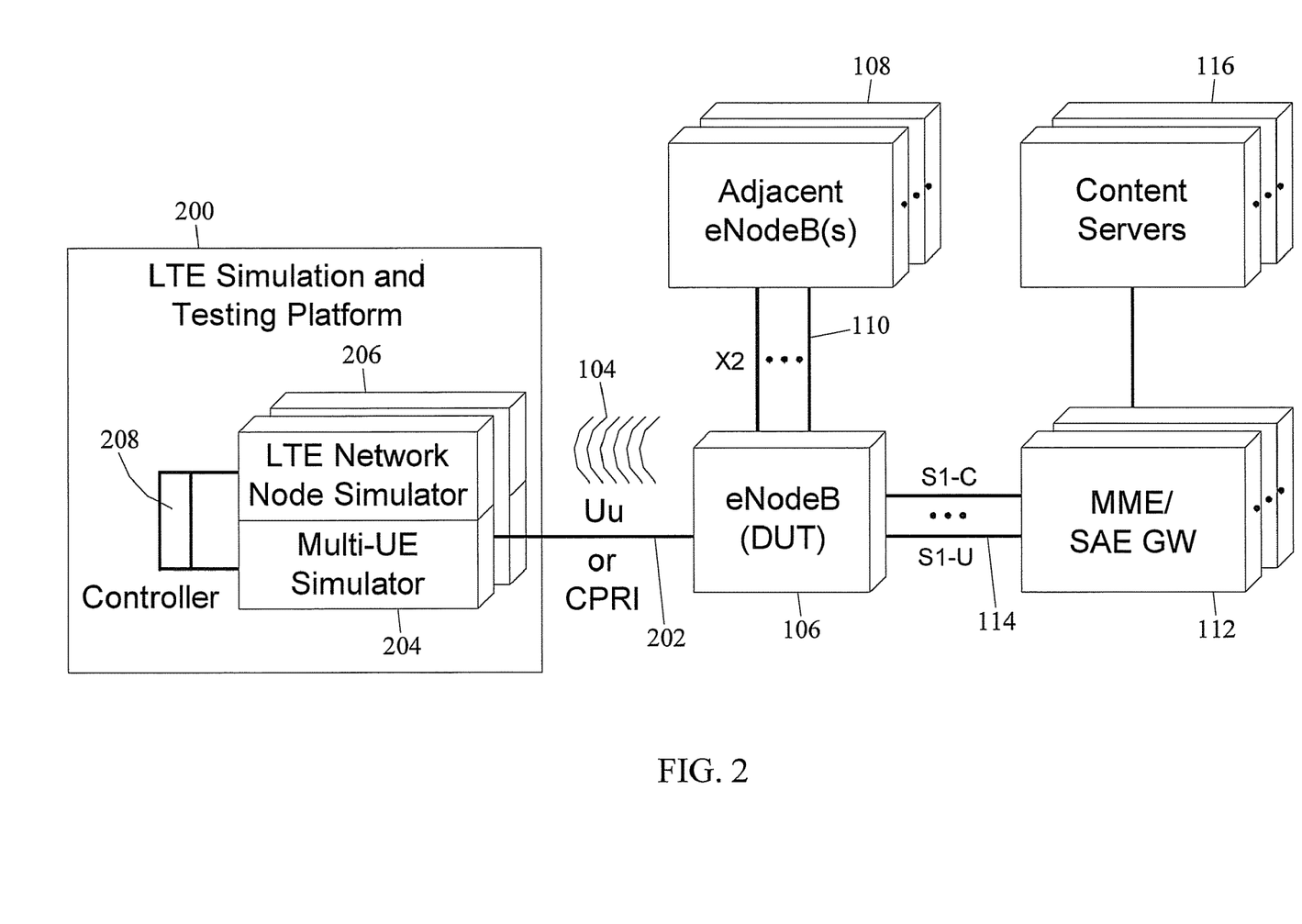
FIG. 2 is a block diagram of an exemplary LTE network including a multi-UE simulator according to an embodiment of the subject matter described herein.

FIG. 2 is a block diagram of an exemplary LTE network including a multi-UE simulator according to an embodiment of the subject matter described herein. Referring to FIG. 2, eNB 106 may include a device under test (DUT). In this case, it may be desirable to simulate multiple UEs connected to eNB 106 for performing stress testing, protocol compliance, etc. Similar to FIG. 1, eNB 106 may be connected to one or more adjacent eNBs 108 via links 110 and to MME/SAE gateway 112 via link 114, wherein MME/SAE gateway 112 may be further connected to content servers 116.

However, in contrast to the embodiment shown in FIG. 1 wherein UE 102 is connected to eNB 106, in the embodiment shown in FIG. 2 LTE, simulation and testing platform 200 may be connected to DUT 106 for simulating multiple UEs. For example, mobile network equipment simulation and testing platform 200 may be connected to DUT 106 via either air interface 104 or, as will be described in greater detail below, wired common public radio interface (CPRI) link 202. Mobile network equipment simulation and testing platform 200 may be comprised of a LTE network node simulator 206 for simulating various types of LTE nodes that may be directly connected to an eNB but excluding UEs, and a multi-UE simulator 204 for simulating multiple UEs. Multi-UE simulator 204 and LTE network node simulator 206 may be connected by controller 208 for managing communications between components of multi-UE simulator 204 and LTE network node simulator 206, which may or may not be physically separated within mobile network equipment simulation and testing platform 200. Thus, it is appreciated that multi-UE simulator 204 and LTE network node simulator 206 may be embodied as separate logical entities within the same physical system, as separate physical sub-systems within the same physical system, or as separate physical subsystems within the same logical system without departing from the scope of the subject matter described herein.

Figure 3:
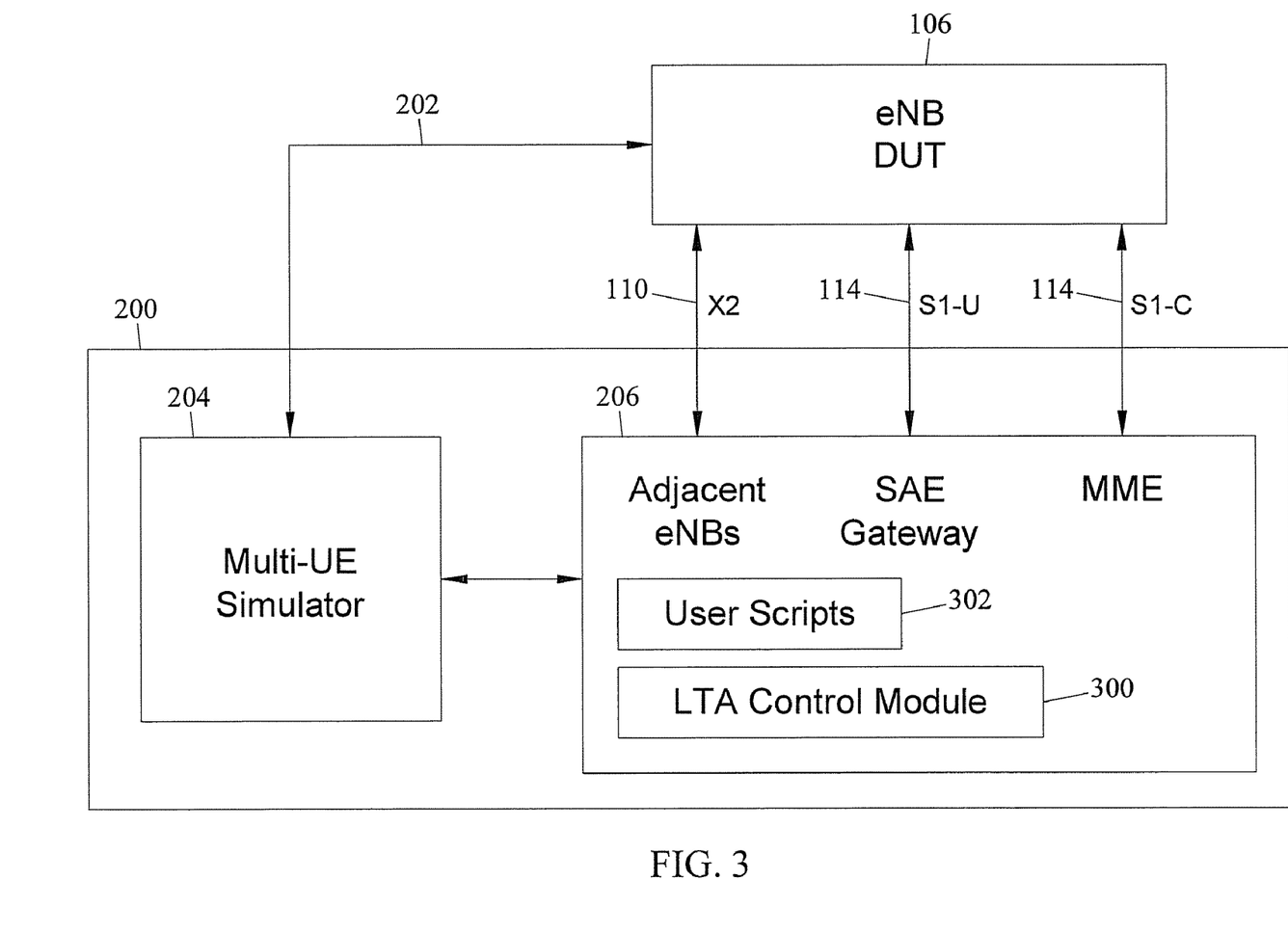
FIG. 3 is a functional block diagram of an exemplary wrap-around configuration of a DUT including an LTE multi-UE simulator according to an embodiment of the subject matter described herein.

FIG. 3 is a functional block diagram of an exemplary wrap-around configuration of an eNB including a mobile network equipment multi-UE simulator according to an embodiment of the subject matter described herein. Referring to FIG. 3, mobile network equipment simulation and testing platform 200 "surrounds" DUT 106 by connecting to all of its interfaces 202, 110, and 114 for simulating multiple UEs as well as simulating adjacent eNBs, SAE gateways, and MMEs.

In the embodiment shown in FIG. 3, mobile network equipment simulation and testing platform 200 includes multi-UE simulator 204 for simulating multiple UEs and LTE network node simulator 206 for simulating other non-UE types of LTE nodes which may be connected to an eNB. Multi-UE simulator 204 may connect to eNB 106 via CPRI link 202. Mobile network equipment simulation and testing platform 200 may include a load test application (LTA) module 300 for managing simulation of adjacent eNBs, SAE gateways, and MMEs, and for executing user scripts. User scripts 302 may include various predetermined sequences of messages representing simulated actions performed by simulated UEs.

LTA module 300 may help perform multi-UE simulation (in conjunction with multi-UE simulator 204), UE call dispatching (including both real and simulated UEs), UE traffic profile configuration, call automation, quality of service (QoS) testing, selective reporting and statistics, and call tracing.

User scripts 302 may include one or more pre-defined scripts for simulating different LTE traffic/load scenarios in which multiple UEs are connected to an eNB. As used herein, a script includes a program or sequence of instructions that is interpreted or carried out by another program (e.g., LTA control module 300) rather than directly by a computer processor itself (as in the case of a compiled program).

In this case, user scripts 302 may be carried out by LTA control module 300. At any given time, the load on an eNB may include UEs continuously connecting and disconnecting to the network, making and receiving calls, sending data, roaming to another eNB within the network, etc. Moreover, the particular mix of UEs and how they behave may be highly dependent upon the network carrier and/or the DUT's location within the network. Therefore, user scripts 302 may include a wide variety of primitive/basic operations that are typically performed by individual UEs so that a network operator can customize their simulated traffic mix to be similar to real world scenarios of interest.

For example, user scripts 302 may include originating scripts associated with a simulated UE that originates a call/session. Originating scripts may include, but are not limited to, attach, detach, session establishment and release, handover, session initiation protocol (SIP) calls, file transfer protocol (FTP) calls, and hypertext transfer protocol (HTTP) calls. Conversely, user scripts 302 may also include terminating scripts associated with a simulated UE that terminates a call/session such as MME-initiated detach, HSS-initiated detach, handover, and SIP/FTP/HTTP calls.

Figure 4:
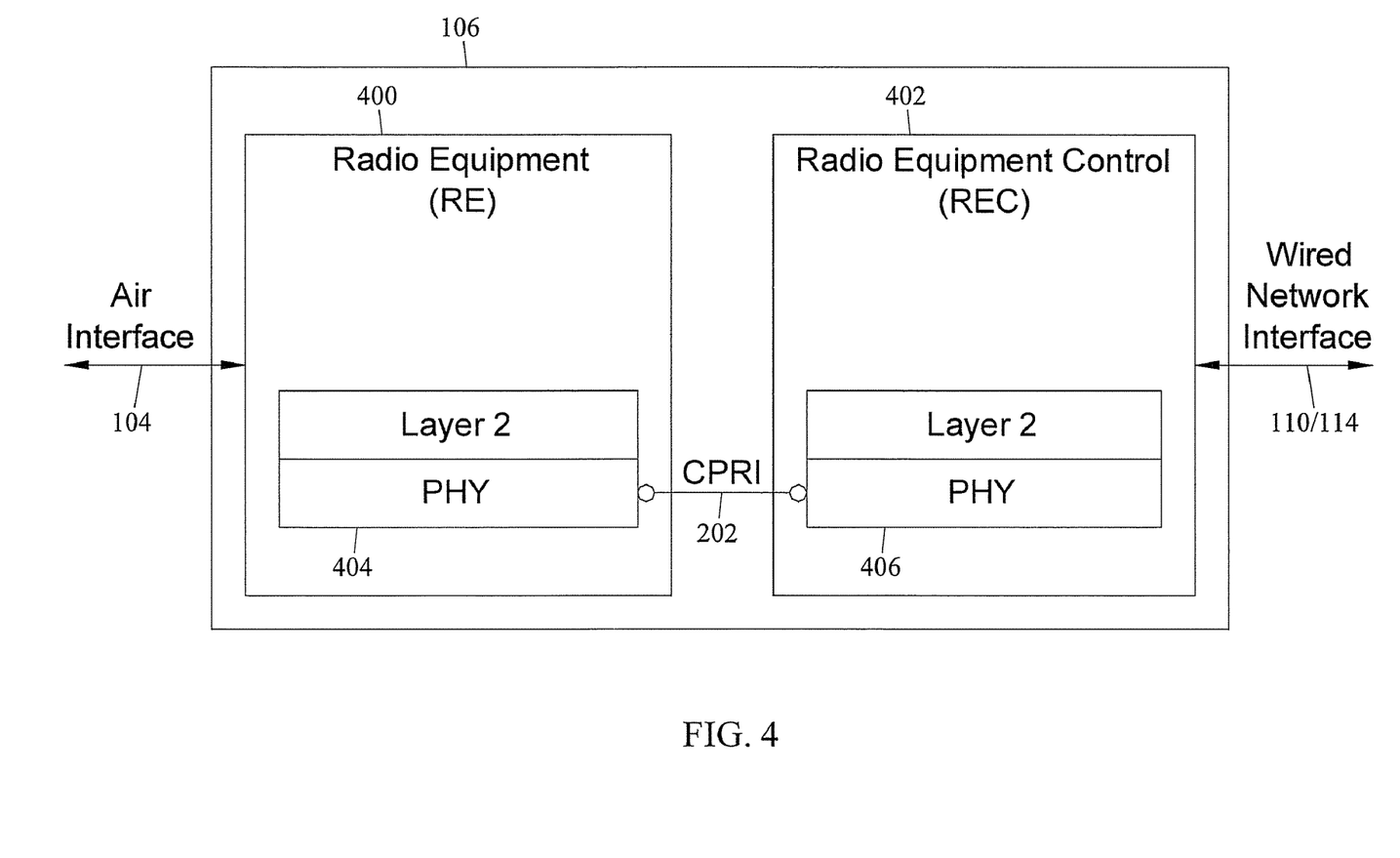
FIG. 4 is block diagram of a logical decomposition of an exemplary LTE eNodeB for interfacing with a multi-UE simulator according to an embodiment of the subject matter described herein.

FIG. 4 is block diagram of a logical decomposition of an exemplary LTE eNodeB for interfacing with a multi-UE simulator according to an embodiment of the subject matter described herein. Referring to FIG. 4, eNB 106 is divided into radio equipment (RE) 400 and radio equipment controller (REC) 402. RE 400 may be a device that serves as the air interface to the user equipment and implements analog radio frequency functions of an eNodeB. RE 400 may include one or more antennas for communicating with one or more UEs, and may include support for a variety of antenna types and configurations including, but not limited to, single omnidirectional antennas and MIMO arrays of directional antennas. Exemplary functions that may be performed by an RE include digital-to-analog (D/A) conversion, analog-to-digital (A/D) conversion, carrier multiplexing, power amplification, and RF filtering. REC 402 may be an LTE network device for implementing radio functions of the digital baseband domain. These functions may include, but are not limited to, radio base station control and management, and channel coding and de-coding. RE 400 and REC 402 are connected via CPRI link 202. It is appreciated that multi-UE simulator 204 may connect to REC 402 via CPRI link 202 rather than interface 110/114 in order to bypass the air interface and thereby simplify the simulation of multiple-UEs and allowing for stress testing an eNB up to and including its full capacity.

It is further appreciated that because multi-UE simulator bypasses RE 400, the subject matter described herein is not intended to be a physical layer tester. Rather, it is assumed that basic physical layer testing is already complete or is handled by other methods. Additionally, in the embodiments described herein, air interface 104 (i.e., uu interface) may be implemented using a wired link rather than air as the transmission medium. As a result, less stringent standards for simulating interface 104 may include, for example, reduced maximum power output, simplified RF receiver and MIMO designs, and eliminating various other aspects (e.g., transmit diversity, beam forming, out-of-band, etc.) without impacting the accuracy of the multi-UE simulation for large numbers of UEs as described herein.

RE 400 and REC 402 may include a physical layer (layer 1) and a MAC/RLC layer (layer 2). For example, an RLC layer may be in charge of flow control as a data link layer, and a MAC layer may transfer (or bear) the data provided by RLC layer. For example, physical layer may perform CQI feedback, override UL/DL scheduling information, open loop configurations (e.g., no HARQ), HARQ testing and control, CRC error rate control, and adaptive rate testing. MAC/RLC layer may perform injection of predefined content (e.g., MAC PDU per logical channel), deterministic preamble for each UE random access, granting request/response confirmation, QoS measurement and confirmation, customized MAC/RLC PDU transmission, DRX support, forced power shutdown, and ARQ statistics. In the embodiment shown in FIG. 4, RE 400 and REC 402 are connected via CPRI link 202 at PHY layers 404 and 406, respectively.

Figure 5:
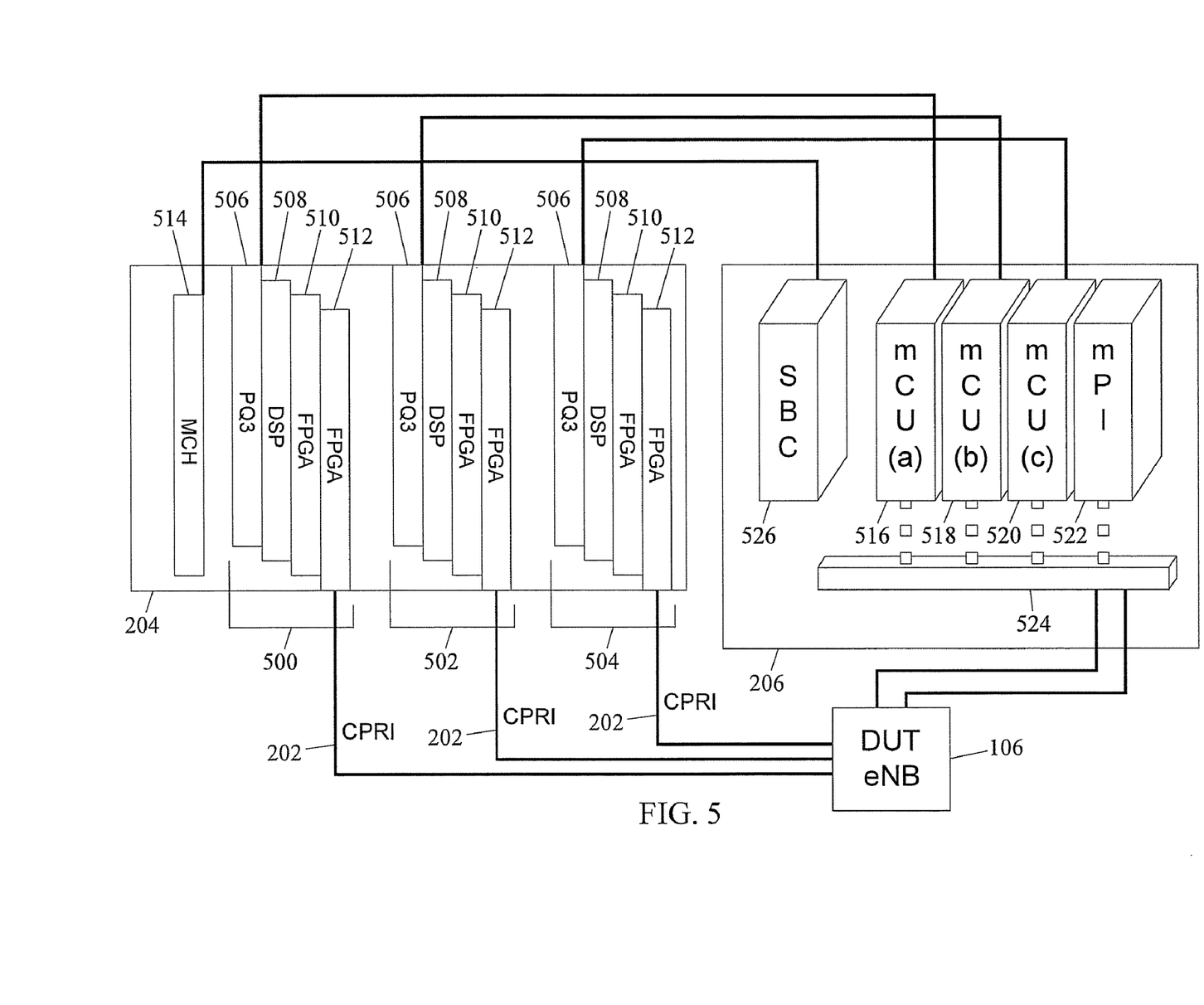
FIG. 5 is a more detailed diagram of a wrap-around configuration including a multi-UE simulator according to an embodiment of the subject matter described herein.

FIG. 5 is a more detailed diagram of the wrap-around configuration shown in FIG. 3 illustrating the use of sector card sets for the multi-UE simulator portion of the LTE simulation and testing platform according to an embodiment of the subject matter described herein. Referring to FIG. 5, each external interface of eNB 106 is connected to either multi-UE simulator 204 or LTE network node simulator 206. For example, CPRI links 202 are connected to multi-UE simulator 204 and X2/S1 links are connected to LTE network node simulator 206.

Within multi-UE simulator 204, each simulated sector may be implemented using a sector card set. In the embodiment shown in FIG. 5, sector card sets 500-504 may each include four cards (e.g., 506, 508, 510, and 512) for collectively performing functions necessary for simulating up to and including the maximum number of supported UEs for a given sector. Stress testing of an eNB may be divided into two aspects: air interface capacity testing and core network simulation. Air interface capacity testing may include testing functions accessing the eNB using the air interface. Core network simulation may include testing functions that access the eNB using interfaces other than the air interface (e.g., S1, X2, etc.).

For example, multi-UE simulator may perform air interface capacity testing of an eNB by simulating approximately 300 connected UEs and 1,000 idle UEs per sector, where the maximum data throughput rate is 150 Mbps per sector. Thus, for a 3-sector cell, an eNB under test may support up to 900 connected UEs and 3,000 idle UEs totaling 450 Mbps.

Regarding core network simulation, the S1 interface may support up to 2,048 connected UEs totaling 500 Mbps and the X2 interface may support up to 128 connected UEs having a maximum of 50 Mbps throughput.

LTE UE status may be divided into deregistered, registered, idle, and connected statuses. As used herein, a "deregistered" UE refers to a UE whose location is not known to the network and the UE is not reachable. Conversely, a "registered" UE refers to a UE with at least one active PDN connection after successful completion of an "attach" or a "tracking area update" procedure and the UE has setup the EPS security context. As used herein, an "idle" UE refers to a UE this has registered with the network but has no NAS connection(s). Finally, a "connected" UE refers to a UE that is both registered and the serving eNB is known and a signaling connection to the MME exists involving an RRC connection and an S1 MME connection.

Additionally, within the industry, some may refer to "active" UEs which, while not an officially defined term within the scope of 3GPP technical specification (TS) 36.306, Release 8, may be useful in describing the functionality of the subject matter described herein. As used herein, the number of "active" UEs refers to the number of UEs that are simultaneously transmitting information at any given time. According to the LTE specification, information is transmitted by a UE within a predefined transmission time interval (TTI). Typically, the TTI for LTE networks is 1 ms and is a limitation in the PDSCH messages. Within each TTI, it is possible for between 100 and 400 UEs to be scheduled for transmission, depending on, among other things, the MIMO configuration, channel bandwidth, channel quality, and resource allocation type. As a result, because connected UEs do not have to transmit in every TTI, a limitation on the number of active UEs does not necessarily correspond to a similar limitation in the number of connected UEs.

LTE network node simulator 206 may include a plurality of processor and interface cards located within a chassis. For example, processor cards may include a mesh computing unit (mCU) card having 5 processors, a cPCI base card (cBC), and a single board computer (SBC). Interface cards may include a mesh physical interface (mPI) card, and a plurality of multiport communications cards for supporting ATM, STM, gigabit rear transmission module (RTM), optical RTM, and the like. These cards may be located within a multi-slot chassis which also includes various other supporting hardware and software. For example, the chassis may include one or more USB, serial, and Ethernet ports, a hard disk drive, random access memory (RAM). In an exemplary configuration, LTE network node simulator 206 may execute an operating system such as SuSE Linux Enterprise Edition (SLED) and provide connections for a monitor, keyboard, and mouse or any other suitable human-computer interface. Additionally, supported internal bus architectures that may be supported may include, but are not limited to, PCI and 1 Gbps Ethernet in either mesh or star configurations. External interfaces may include OC-1, OC-3, and OC-12, J1/E1/T1, Ethernet, serial, CII, and structure STM-1/OC-3.

Multi-UE simulator may be similarly configured/implemented using cards located within a chassis having a processor, memory, OS, internal communications bus, and external communications interfaces. However, in contrast to LTE network node simulator 206, multi-UE simulator 204 may include one or more sector card sets for simulating multiple UEs/multi-UE usage scenarios for a simulated sector and one or more additional cards for performing various other functions such as communicating with LTE network node simulator 206.

An example of a commercially available LTE simulation and testing platform suitable for use with embodiments of the present invention is the DCT2000®/LTE available from Catapult Communications of Mountain View, Calif. LTE simulation and testing platform may include rackmount and desktop form factors, and based on PCI and cPCI industry standards. Mobile network equipment simulation and testing platform 200 may be based on the m500 chassis (e.g., 10U 23I rackmount form factor) that includes 18 cPCI card slots and a mesh architecture. Mobile network equipment simulation and testing platform 200 may support all major LTE network elements, protocols, simulators, and network interfaces to support functional and stress testing for e-NodeBs, access and core network elements, interworking of LTE MME with UTRAN and GERAN networks, and interworking of non-3GPP networks. Specifically, eNBs may be tested by simulating user equipment, other eNodeBs, MMEs, and SAE GWs. Access and core network elements may be tested by simulating PDN Gateways, PCRFs, SAE GWs, MMEs and e-nodeBs. Interworking of LTE MMEs with UTRAN and GERAN networks may be tested by simulating HSSs and SGSNs. Interworking of non-3GPP networks (e.g. WiMAX) may be tested by simulating the 3GPP AAA proxies/servers, mobile access gateways, foreign agents (FA), and IP access system routers. Mobile network equipment simulation and testing platform 200 may support simulated LTE interfaces including, but not limited to, S1, S2a/b/c, S3, S4, S5, S6a, S7, S8 a/b, S10, S11, S12, X2, and LTE-Uu interfaces. Multiple concurrent physical interfaces to the network (or DUT), on-board processors for running multiple protocols simultaneously, and traffic generation for high load voice and video traffic may also be supported by mobile network equipment simulation and testing platform 200. Finally, codec support for mobile network equipment simulation and testing platform 200 may include AMR NB, G.711, G.729, G.723, and RFC 3267 codecs.

Sector card sets 500, 502, and 504 may each include PQ3 card 508 for performing main control, script download, UE configuration, and RLC/MAC operation. DSP card 508 may implement physical layer functionality and MIMO signal processing. FPGA1 card 510 may perform physical layer channel encoding and decoding operations, while FPGA2 card 512 may perform CPRI handling for CPRI link 202 to DUT eNB 106. Finally, in addition to sector card sets 500-504, multi-UE simulator 204 may include microTCA carrier hub (MCH) 514 for switching data among cards 508-512 between card sets 500-504 and connecting to LTE network node simulator 206. According to one possible embodiment, multi-UE simulator may include additional sector card sets and/or MCHs without departing from the scope of the subject matter described herein.

Figure 6:
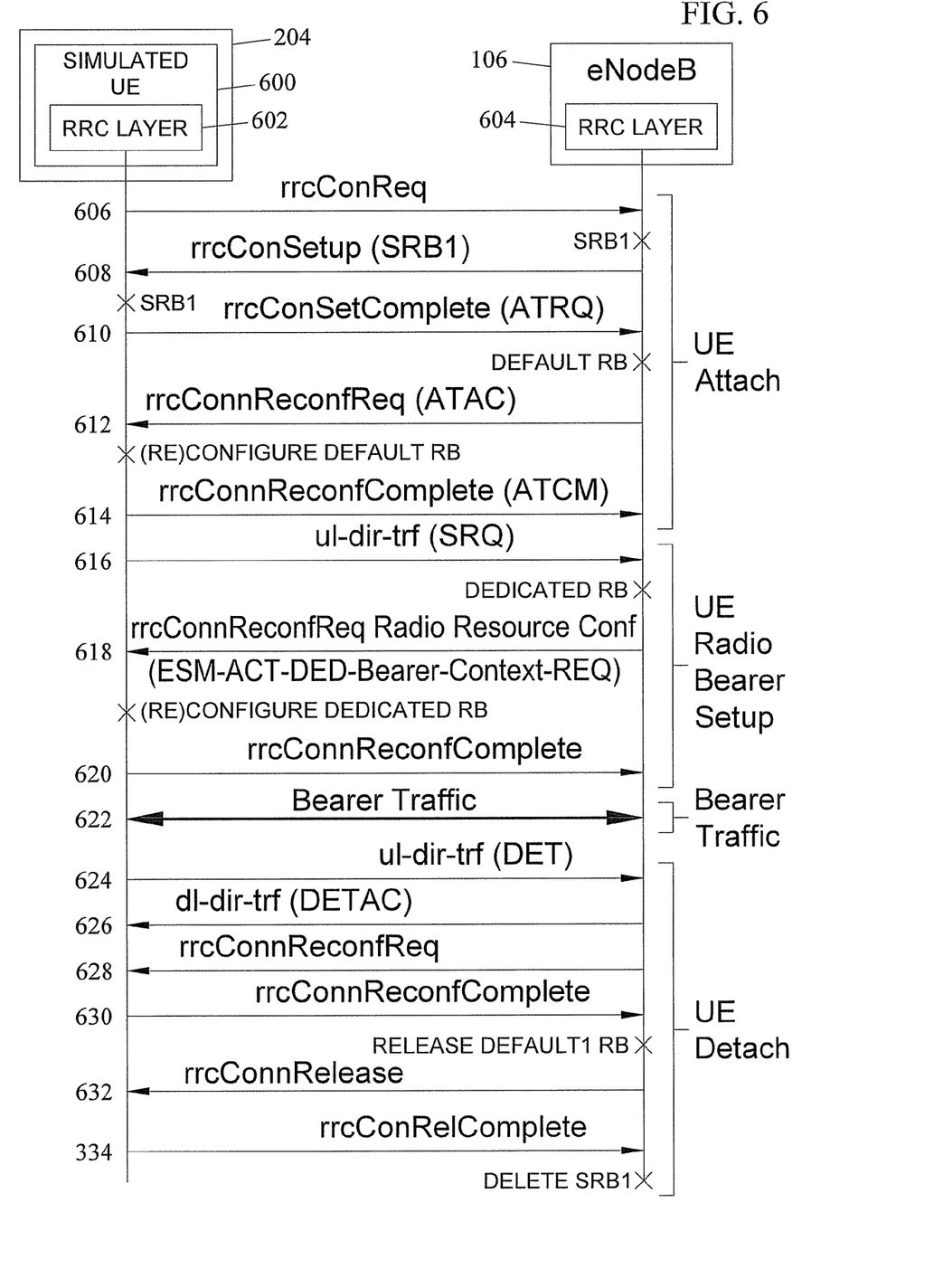
FIG. 6 is message sequence diagram of exemplary messages exchanged between a simulated UE and an LTE eNodeB for performing multi-UE simulation according to an embodiment of the subject matter described herein.

FIG. 6 is message sequence diagram of exemplary messages exchanged between a simulated UE and an LTE eNodeB for performing multi-UE simulation according to an embodiment of the subject matter described herein. Referring to FIG. 6, simulated UE 600 may include RRC layer 602 and be one of several hundred or thousands simulated UEs managed by multi-UE simulator 204. RRC layer 602 may communicate with corresponding RRC layer 606 of DUT eNB 106 for simulating various actions that may be performed in a typical LTE network. For example, FIG. 6 shows an exemplary process for UE attachment, radio bearer setup, exchange of bearer traffic, and UE detachment. Current 3GPP specifications require that a single radio bearer (RB) be allocated per activated service. A packet data protocol (PDP) context activation in 3GPP systems is also dedicated to a single bearer service. Primary PDP context activation may perform IP configuration and functions associated with session initiation protocol (SIP) signaling. A secondary PDP context activation is needed for each additional bearer service. As a result, a three-way handshake process may be performed for each additional service to be activated, such as e-mail, streaming, web browsing, and the like.

UE 600 may send RRC_CONNECTION_REQUEST 606 for establishing a signaling radio bearer (SRB). In LTE, three signaling radio bearers are defined: SRB0, SRB1 and SRB2. SRB0 is for RRC messages using the CCCH logical channel. SRB1 is for NAS messages and low-priority RRC messages using DCCH logical channel. SRB2 is for high-priority RRC messages using DCCH logical channel. RRC_CONNECTION_REQUEST 606 may include an identifier assigned to UE 600 by the non access stratum (NAS) (i.e., core network). The RRC protocol may perform functions such as broadcasting system information and RRC connection control (i.e., establishment/modification/release of RRC connections, RRC connection mobility, QoS control, and recovery from radio link failure).

In response to receiving RRC_CONNECTION_REQUEST 606, eNB 604 responds with RRC_CONNECTION_ SETUP 608 for establishing SRB1. eNB 106 then returns RRC_CONNECTION_SETUP_COMPLETE 610 establishing a default RB. To set up an RB means to define protocol layers and channel characteristics necessary to provide a specific service and to designate each concrete parameter and operation method. Once a RB has been established, the UE may wait for uplink/downlink bandwidth assignments on the physical downlink control channel (PDCCH), which is broadcast every TTI (i.e. 1,000 times a second). In downlink direction, resources are scheduled for the device on the PDCCH whenever data arrives from the network. In uplink direction, the mobile is only allowed to send data on the physical uplink shared channel (PUSCH) when the network schedules uplink transmission opportunities on the PDCCH. For example, uplink resources may be scheduled based on the amount of data in the uplink buffer of the UE. The default RB may then be configured/reconfigured in step 614 by sending RRC_CONNECTION_RECORD_REQUEST 612 from eNB 106 to UE 600. In response, RRC_CONNECTION_RECONFIGURE_COMPLETE 614 may be returned to eNB 106 in order to complete (re)configuration of the default RB.

Beginning at step 616, a dedicated RB may be setup for transferring user data between simulated UE 600 and the UMTS terrestrial radio access network (UTRAN) (e.g., eNB 106). For example, SRQ 616 may be transmitted to eNB 106 for establishing a radio bearer. In response, a dedicated RB may be established. The dedicated RB may be subsequently (re)configured by transmitting RRC_CONFIGURATION_REQUEST RADIO_RESOURCE_CONDIFUGURATION 618 and RRC_CONNECTION_RECONFIGURATION_COMPLETE 620.

After UE 600 is attached and SRB and RB have been established, bearer traffic may be transmitted in step 622 between UE 600 and eNB 106.

Once data transmission is complete and the UE wishes to disconnect from the network, a UE detachment procedure may begin at step 624 that includes releasing the SRB and RB resources. For example, DETACH message 624 may be sent by UE 600 to eNB 106 and DETACH message 626 may be received in return. Thereafter, RRC_CONNECTION RECONFIGURATION_REQUEST 628 and RRC_CONNECTION_RECONFIGURATION_COMPLETE 630 may be exchanged for releasing the default RB. Similarly, RRC_CONNECTION_RELEASE 632 and RRC_CONNECTION_REL_COMPLETE 634 may be exchanged for deleting SRB1.

Figure 7:
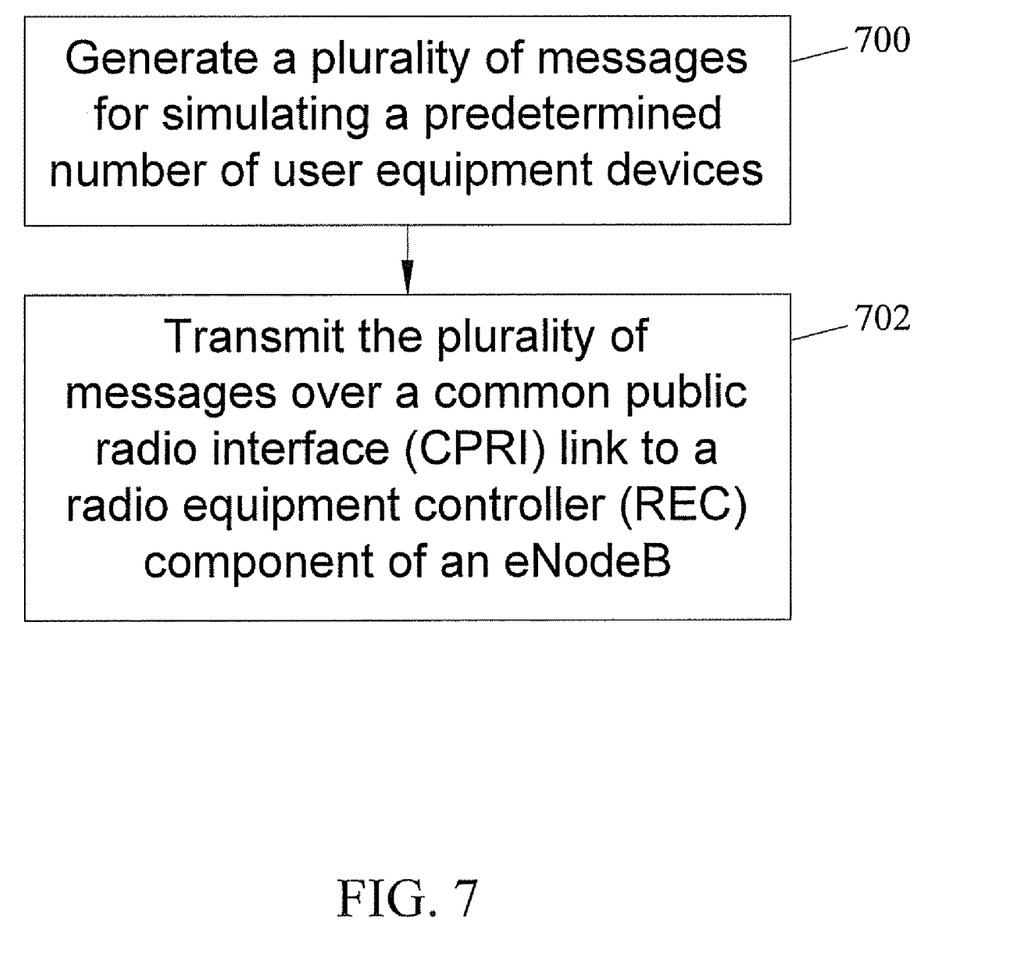
FIG. 7 is a flow chart of exemplary steps for stress testing an eNB by simulating multiple UEs over a CPRI link according to an embodiment of the subject matter described herein.

FIG. 7 is a flow chart of exemplary steps for testing an eNB by simulating multiple UEs over a CPRI link according to an embodiment of the subject matter described herein. Referring to FIG. 7, in step 700, a plurality of messages are generated for simulating a predetermined number of user equipment (UE) devices.

In step 702, the plurality of messages are transmitted over a common public radio interface (CPRI) link to a radio equipment controller (REC) of a eNodeB (eNB).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for stress testing mobile network equipment using common public radio interface (CPRI), the method comprising:
generating, at a multiple user equipment (multi-UE) simulator, a plurality of messages for simulating a plurality of user equipment (UE) devices, wherein generating the plurality of messages for simulating the plurality of UE devices includes simulating a predetermined mix of at least one of registering and deregistering UEs, UE handovers, and a quality of experience (QoE) of selected UEs on top of a background load, wherein generating the plurality of messages for simulating the plurality of UE devices includes simulating at least one of an S1-C, S1-U, uu, and X2 interface; and
stress testing a radio equipment controller (REC) component of a mobile network device by transmitting the plurality of messages over a common public radio interface (CPRI) link to the REC component, wherein the CPRI link is a wired link that provides direct connection between the REC component and the multi-UE simulator.

2. The method of claim 1 wherein the mobile network device includes one of a BS, a Node B, and an evolved Node B (eNB).

3. The method of claim 1 comprising generating and transmitting a plurality of messages for simulating at least one of a system architecture evolution (SAE) gateway, a mobility management entity (MME), and an adjacent mobile network device.

4. The method of claim 1 comprising executing one or more pre-defined, user-customizable scripts for simulating different traffic/load scenarios.

5. The system of claim 1 comprising logging messages on a per-UE basis.

6. The method of claim 1 wherein generating the plurality of messages for simulating the plurality of UE devices includes simulating UEs on a per-sector basis.

7. The method of claim 1 wherein generating the plurality of messages for simulating the plurality of UE devices includes simulating at least one of inter-mobile network device handover, intra-mobile network device handover, and inter-radio access technology (IRAT).

8. The method of claim 1 wherein generating the plurality of messages for simulating the plurality of UE devices includes simulating at least one of video, voice, and data traffic.

9. The method of claim 1 wherein generating the plurality of messages for simulating the plurality of UE devices includes simulating at least one of a 1-sector, 3-sector, and a 6-sector cell.

10. A system for stress testing mobile network equipment using common public radio interface (CPRI), the system comprising:
a radio equipment controller (REC) component of a mobile network device for receiving messages over a common public radio interface (CPRI) link; and
a multiple user equipment (multi-UE) simulator for stress testing the REC component by generating and transmitting a plurality of messages for simulating a predetermined number of user equipment (UE) devices to the REC over the CPRI link, wherein the CPRI link is a wired link that provides direct connection between the REC component and the multi-UE simulator,
wherein the multi-UE simulator is configured to simulate a predetermined mix of registering and deregistering UEs, UE handovers, and a quality of experience (QoE) of selected UEs on top of a background load, wherein the multi-UE simulator is associated with at least one of an S1-C, S1-U, uu, and X2 interface.

11. The system of claim 10 wherein the mobile network device includes one of a BS, a Node B, and an evolved Node B (eNB).

12. The system of claim 10 comprising a mobile network node simulator for generating and exchanging messages with the mobile network device for simulating at least one of a system architecture evolution (SAE) gateway, a mobility management entity (MME), and an adjacent mobile network device.

13. The system of claim 10 wherein the multi-UE simulator includes a first interface for switching data between the multi-UE simulator and an external device.

14. The system of claim 10 wherein the multi-UE simulator includes at least a first module for performing main control, script download, UE configuration, and radio link control (RLC)/medium access control (MAC) operation.

15. The system of claim 10 wherein the multi-UE simulator includes at least a second module for implanting physical layer (PHY) functionality, multiple input multiple output (MIMO) functionality, and signal processing.

16. The system of claim 10 wherein the multi-UE simulator includes at least a third module for performing physical layer (PHY) channel encoding and decoding.

17. The system of claim 10 wherein the multi-UE simulator includes at least a fourth module for performing CPRI processing.

18. The system of claim 10 wherein the CPRI link supports 5, 10, 15, and 20 MHz channels, binary phase-shift keying (BPSK), quadrature phase-shift keying (QPSK), 16 quadrature amplitude modulation QAM, and 64 QAM, 4×4 multiple input multiple output (MIMO), and hybrid automatic repeat-request (HARQ).

19. The system of claim 10 wherein the multi-UE simulator is configured to simulate inter-mobile network device handover, intra-mobile network device handover, and inter-radio access technology (IRAT).

20. The system of claim 10 wherein the multi-UE simulator is configured to simulate video, voice, and data traffic.

21. The system of claim 10 wherein the multi-UE simulator is configured to log one or more of media access control (MAC)-physical layer (PHY), radio link control (RLC)-MAC, and RLC messages.

22. The system of claim 10 wherein the multi-UE simulator is configured to log messages on a per-UE basis.

23. The system of claim 10 wherein the multi-UE simulator is configured to simulate the plurality of UEs on a per-sector basis.

24. A computer readable medium comprising computer executable instructions embodied in a tangible computer readable medium and when executed by a processor of a computer performs steps comprising:

generating, at a multiple user equipment (multi-UE) simulator, a plurality of messages for simulating a plurality of user equipment (UE) devices, wherein generating the plurality of messages for simulating the plurality of UE devices includes simulating a predetermined mix of at least one of registering and deregistering UEs, UE handovers, and a quality of experience (QoE) of selected UEs on top of a background load, wherein generating the plurality of messages for simulating the plurality of UE devices includes simulating at least one of an S1-C, S1-U, uu, and X2 interface; and stress testing a radio equipment controller (REC) component of a mobile network device by transmitting the plurality of messages over a common public radio interface (CPRI) link to the REC component, wherein the CPRI link is a wired link that provides direct connection between the REC component and the multi-UE simulator.

* * * * *